(12) United States Patent
Onishi et al.

(10) Patent No.: US 8,356,948 B2
(45) Date of Patent: Jan. 22, 2013

(54) STRUCTURE FOR MOUNTING CAMERA ON VEHICLE

(75) Inventors: Motoyasu Onishi, Kanagawa (JP);
Tadahiro Matori, Saitama (JP)

(73) Assignees: Honda Elesys Co., Ltd., Kanagawa (JP);
Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/067,266

(22) Filed: May 19, 2011

(65) Prior Publication Data

US 2012/0099849 A1    Apr. 26, 2012

(30) Foreign Application Priority Data

Oct. 25, 2010   (JP) ............................. P. 2010-239072

(51) Int. Cl.
*G03B 17/00* (2006.01)
(52) U.S. Cl. ....................................................... 396/419
(58) Field of Classification Search ........... 396/419–428
See application file for complete search history.

(56) References Cited

U.S. PATENT DOCUMENTS

| | | | |
|---|---|---|---|
| 5,330,149 A | 7/1994 | Haan et al. | |
| 5,377,949 A | 1/1995 | Haan et al. | |
| 5,820,097 A | 10/1998 | Spooner | |
| 6,196,504 B1 * | 3/2001 | Lemke | 248/187.1 |
| 6,848,662 B2 * | 2/2005 | Paramonoff et al. | 248/309.1 |
| 7,185,862 B1 * | 3/2007 | Yang | 248/187.1 |
| 2005/0037640 A1 * | 2/2005 | Messina et al. | 439/71 |
| 2007/0237517 A1 * | 10/2007 | Park | 396/427 |
| 2008/0231704 A1 | 9/2008 | Schofield et al. | |
| 2009/0213480 A1 * | 8/2009 | Li | 359/844 |

FOREIGN PATENT DOCUMENTS

| | | |
|---|---|---|
| JP | 5-116870 | 5/1993 |
| JP | 6-81824 | 11/1994 |
| JP | 3029339 | 7/1996 |
| JP | 2004-82829 | 3/2004 |
| JP | 2006-327514 | 12/2006 |
| JP | 2009-139850 | 6/2009 |
| JP | 2010-195235 | 9/2010 |
| JP | 2010-260371 | 11/2010 |

OTHER PUBLICATIONS

Japanese Office Action dated Jul. 26, 2011 issued in corresponding Japanese Patent Application No. 2010-239072.

* cited by examiner

*Primary Examiner* — Clayton E Laballe
*Assistant Examiner* — Dennis Hancock

(57) ABSTRACT

According to one embodiment, there is provided a structure for mounting a camera on a vehicle, including: a base fixed to a vehicle body; a camera; a slide mechanism configured to allow the camera to slide in a sliding direction so as to be detachably engaged with the base; and a spring member configured to generate a pressing force in a direction perpendicular to the sliding direction between the base and the camera in an engaged state, thereby holding the camera with respect to the base.

10 Claims, 5 Drawing Sheets

STRUCTURE FOR MOUNTING CAMERA ON VEHICLE

CROSS-REFERENCE TO RELATED APPLICATION(S)

This application claims priority from Japanese Patent Application No. 2010-239072 filed on Oct. 25, 2010, the entire contents of which are incorporated herein by reference.

FIELD

The embodiments described herein relate generally to a structure for mounting a camera on a vehicle.

BACKGROUND

A camera is mounted on a vehicle to capture images outside the vehicle. For example, the camera is used as a part of a drive recorder that records a front image of the vehicle. For example, in JP-2010-195235-A, to mount the camera on the vehicle, an attachment portion is fixed to a front glass of the vehicle using a double-sided tape, and then, the camera is fixed to the attachment portion using bolts.

When the camera is fixed by bolts, the attaching/detaching of the camera to/from the vehicle is inconvenient.

SUMMARY

According to a first aspect of the present invention, there is provided a structure for mounting a camera on a vehicle, including: a base fixed to a vehicle body; a camera; a slide mechanism configured to allow the camera to slide in a sliding direction so as to be detachably engaged with the base; and a spring member configured to generate a pressing force in a direction perpendicular to the sliding direction between the base and the camera in an engaged state, thereby holding the camera with respect to the base.

According to a second aspect of the present invention, there may be provided the structure, wherein the spring member includes an S-shaped spring portion attached to the camera, the S-shaped spring portion including: a first spring plate portion inclining such that a rear portion thereof in the sliding direction goes away from the camera; a second spring plate portion extending from a rear end of the first spring plate portion in the sliding direction and inclining to an opposite direction to the first spring plate portion; and a third spring plate portion extending from a rear end of the second spring plate portion in the sliding direction and inclining to an opposite direction to the second spring plate portion.

According to a third aspect of the present invention, there may be provided the structure, wherein the base includes a locating portion to be engaged with the S-shaped spring portion to thereby locate the camera in the sliding direction.

According to a fourth aspect of the present invention, there may be provided the structure, wherein the spring member is attached to the camera at a side of the first spring plate portion.

According to a fifth aspect of the present invention, there may be provided the structure, wherein the base includes sliding guide portions respectively provided at left and right sides of the sliding direction, wherein the camera includes slide walls respectively provided at the left and right sides of the sliding direction, the slide walls having slide concave portions respectively formed on facing sides thereof, and wherein the slide mechanism is formed of the sliding guide portions and the slide concave portions.

According to a sixth aspect of the present invention, there may be provided the structure, wherein the spring member is attached to the camera between the left and right slide walls.

According to the first aspect, when the camera is engaged with the base fixed to the vehicle body by sliding the camera through the slide mechanism, the spring member generates the pressing force in the direction perpendicular to the sliding direction between the base and the camera, thereby holding the camera on the base. Since the camera can be attached/detached to/from the base by sliding the camera against the sliding resistance due to the pressing force of the spring member, the camera can be easily attached/detached. Further, since the spring member is provided as a separate member, the above advantage is obtained even when the base and the camera are made of a non-elastic metal.

According to the second aspect, for example, when the camera is slid to be engaged with the vehicle body, the first spring plate portion of the spring member comes in contact with the rear edge of the direction where the base is mounted and slid. The first spring plate portion is then deformed toward the camera side due to its inclination so as to be entered into the camera side of the base. Thereafter, the spring member proceeds in contact with the base at the bending portion between the first spring plate portion and the second spring plate portion, and slightly returns to the side away from the camera when the bending portion moves away from the base. In this state, the third spring plate portion is contacted with the base to generate a pressing force in the direction perpendicular to the sliding direction between the base and the camera to thereby hold the camera on the base. Since the spring member includes the S-shaped spring portion formed of the first to third spring plate portions, while not only the load for attaching/detaching the camera but also the load for holding the camera on the base can be easily adjusted, the camera can be prevented from being unintentionally detached from the base.

According to the third aspect, since the locating portion of the base locates the camera in the sliding direction by being engaged to the S-shaped spring portion, the camera can be easily located in the sliding direction with respect to the base with a simple structure.

According to the fourth aspect, since the spring member is attached to the camera at a side of the first spring plate portion, the base can smoothly ride on the second spring plate portion, thereby preventing the spring member from being reversely opened.

According to the fifth aspect, since the slide mechanism is formed of the left and right sliding guide portions of the base and the left and right slide concave portions formed to face with each other in the left and right slide walls of the camera, the camera can be detachably attached onto the base with a simple structure, thereby suppressing the cost.

According to the sixth aspect, since the spring member is attached between the left and right slide walls of the camera, in a state where the camera is mounted on the base, the spring member can be surrounded so as not to be exposed. As a result, an external appearance can be improved.

BRIEF DESCRIPTION OF DRAWINGS

FIGS. 1A to 1C are perspective views showing a first embodiment, in which FIG. 1A shows the state before an engagement, FIG. 1B shows the state during the engagement, and FIG. 1C shows the state after the engagement.

DETAILED DESCRIPTION

A structure for mounting a camera on a vehicle according to a first embodiment is described with reference to FIGS. 1A to 11.

Figure 1A:
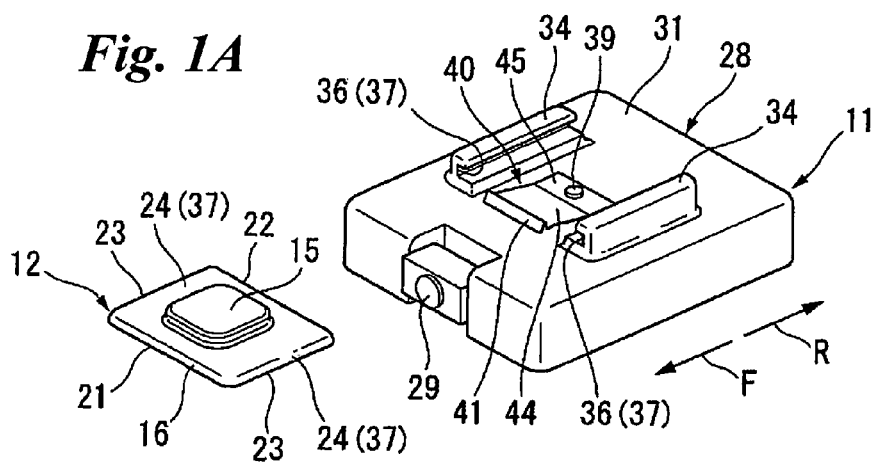
Figure 1B:
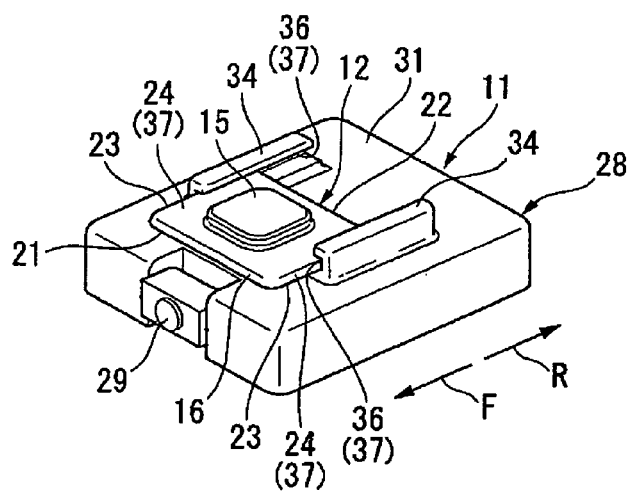
Figure 1C:
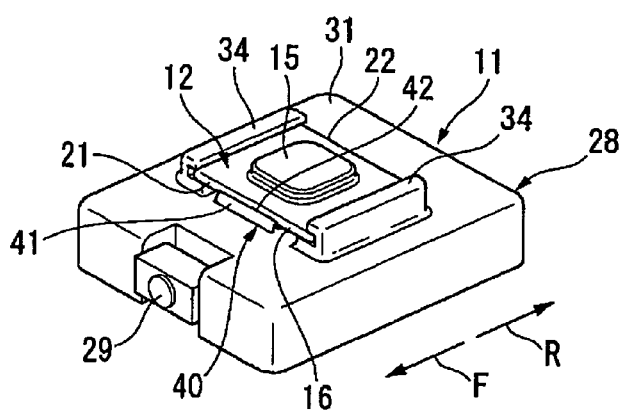
Figure 2:
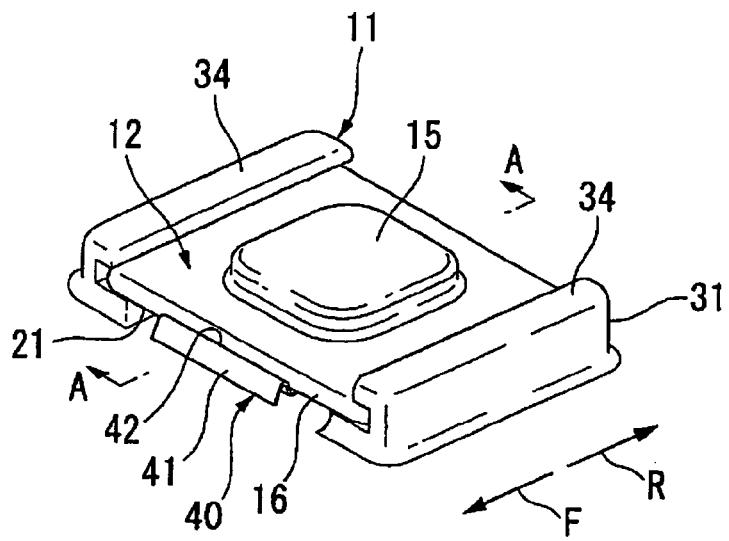
FIG. 2 is a partial perspective view showing the state after the engagement of the first embodiment.

In the drawings, a camera 11 and a base 12 for mounting the camera 11 on a vehicle are illustrated. As shown in FIGS. 1A to 1C, the camera 11 is slidable with respect to the base 12 to be attached/detached to/from the base 12.

Figure 3:
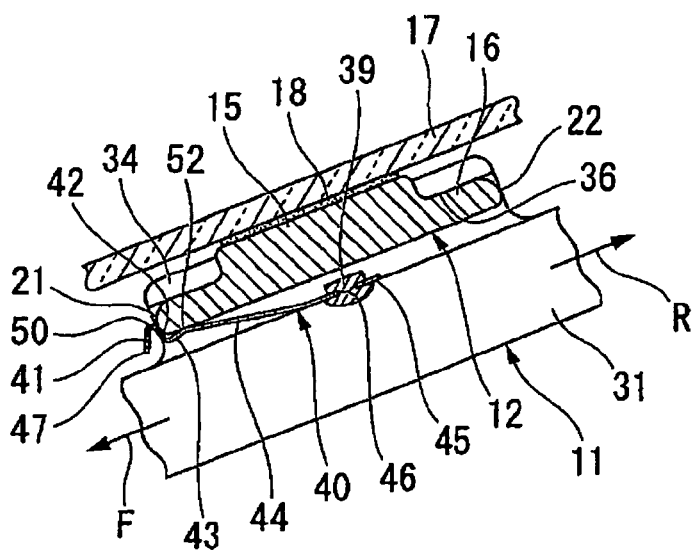
FIG. 3 is a cross-sectional view taken along the line A-A of FIG. 2.

The base 12 includes an attachment portion 15 and a guide plate portion 16. The attachment portion 15 is an approximately rectangular plate having a low height. The guide plate portion 16 is a rectangular plate extends from the bottom of the attachment portion 15 in four directions. The attachment portion 15 and the guide plate 16 of the base 12 are integrally formed, for example, by a metal casting. Generally, the vehicle has a front glass 17 inclining toward the forward and downward direction. As shown in FIG. 3, the top surface of the attachment portion 15 is bonded to the front grass 17 by a double-sided adhesive sheet 18 to thereby attach the base 12 onto the front glass 17.

The guide plate 16, which is disposed at an opposite side to the front glass 17 with respect to the attachment portion 15, includes a front edge 21, a rear edge 22, and left and right side edges 23 and 23. As shown in FIGS. 1A to 1C, the front and rear edges 21 and 22 are arranged in parallel, and the left and right side edges 23 and 23 are arranged in parallel with each other to be perpendicular to the front and rear edges 21 and 22. Both side portions of the guide plate 16 (including the side edges 23 and 23) extending further to the left and right sides than the attachment portion 15 form sliding guide portions 24 and 24.

The camera 11 includes a camera body 28 having various built-in parts for a capturing and a lens unit 29 connected to a front end of the camera body 28 so as to be rotatable in the up-down direction. The camera 11 is mounted on the vehicle so that the lens unit 29 faces a front of the vehicle. The camera body 28 is covered with a case 31. On the top surface of the case 31, left and right walls 34 and 34 are provided to protrude therefrom and to extend in a forward-rearward direction. The entire case 31 including the left and right slide walls 34 and 34 is integrally formed, for example, by a metal casting.

On facing sides of the left and right slide walls 34 and 34, slide concave portions 36 and 36 are respectively formed. The slide concave portions 36 and 36 are depressed to be away from each other, and extends in the forward-rearward direction to be in parallel with the top surface of the case 31. That is, the left and right slide concave portions 36 and 36 are formed on the left and right slide walls 34 and 34 to face with each other. The camera 11 is mounted on the base 12 by fitting the sliding guide portions 24 and 24 and the concave portions 36 and 36, respectively, and sliding the camera 11 in a forward direction (F). In that state, the camera 11 is detached from the base 12 by sliding the camera 11 in a rearward direction (R). The sliding guide portions 24 and 24 and the slide concave portions 36 and 36 form a slide mechanism 37 for allowing the camera 11 to be detachably engaged with the base 12 through a sliding operation.

A protrusion 39 is integrally formed (for example, by the metal casting) on the top surface of the case 31 of the camera 11 so as to protrude upwardly at a central position between the left and right slide walls 34 and 34. A spring member 40 is attached between the left and right slide walls 34 and 34 of the camera 11, and fixed to the protrusion 39 by staking.

As shown in FIG. 3, the spring member 40 includes first to fourth spring plate portions 41 to 44 and an attachment plate portion 45. The first spring plate portion 41 inclines toward the rearward and upward direction with respect to the camera-mounting direction (F) (a direction in which a rear portion of the first spring plate portion 41 goes further away from the camera 11). The second spring plate portion 42 extends from a rear end of the first spring plate portion 41, and inclines toward the rearward and downward direction with respect to the first spring plate portion 41 (an opposite direction to the first spring plate portion 41). The third spring plate portion 43 extends from a rear end of the second spring plate portion 42, and inclines toward the rearward and upward direction with respect to the second spring plate portion 42 (an opposite direction to the second spring plate portion 42). The fourth spring plate portion 44 extends from a rear end of the third spring plate portion 43, and inclines toward the rearward and downward direction with respect to the third spring plate portion 43. The attachment plate portion 45 extends from a rear end of the fourth spring plate portion 44, and inclines toward the rearward and upward direction with respect to the fourth spring plate portion 44 so as to be in the sliding direction of the camera 11.

The spring member 40 is fixed to the case 31 by inserting the protrusion 39 into an attachment hole 46, and staking the inserted protrusion 39 with the attachment plate portion 45 in a state where the attachment plate 45 is in contact with the top surface of the case 31. The first spring plate portion 41, the second spring plate portion 42, and the third spring plate portion 43 from an S-shaped spring portion 47.

When the camera 11 is attached to the base 12 fixed to the front glass 17, as shown in FIGS. 1A to 1C, the left and right sliding guide portions 24 and 24 and the left and right slide concave portions 36 and 36, which form the slide mechanism 37, are fitted, and the camera 11 is forwardly slid along the forward-rearward direction of the vehicle. In the initial state, the first spring plate portion 41 (which inclines toward the rearward and upward direction) of the spring member 40 comes in contact with the rear edge 22 of the base 12, and is downwardly deformed under the base 12 due to the inclination thereof. As a result, the spring member 40 generates a pressing force in the direction perpendicular to the sliding direction (perpendicular to the top surface of the camera 11) between the base 12 and the camera 11 by deforming toward the top surface of the case 31.

Figure 4:
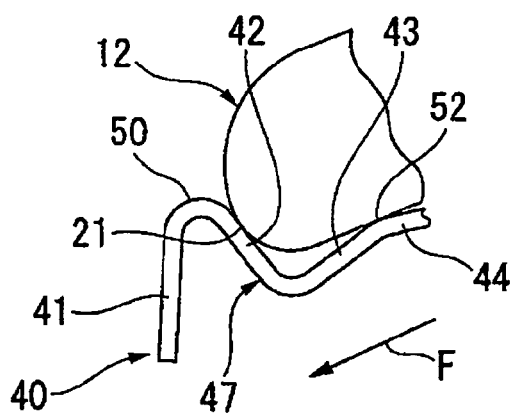
FIG. 4 shows an example of a base and a spring member of the first embodiment.

As shown in FIG. 3, a bending portion 50 is provided between the first spring plate portion 41 inclining toward the rearward and upward direction and the second spring plate portion 42 inclining toward the rearward and downward direction with respect to the first spring plate portion 41. After the initial state, the spring member 40 is moved while generating a relatively large sliding resistance through the contact with the bottom of the base 12 at the bending portion 50. As the bending portion 50 moves away from the bottom of the base 12, the spring member 40 slightly returns to the upward direction so as to reduce the sliding resistance, and the second spring plate portion 42 is engaged to the front edge 21 of the base 12, as shown in FIG. 4. In this state, a bending portion 52 provided between the third spring plate portion 43 inclining toward the rearward and upward direction and the fourth spring plate portion 44 inclining toward the rearward and downward direction comes in contact with the bottom of the base 12. And, the spring member 40 generates a pressing force in the direction perpendicular to the sliding direction (perpendicular to the top surface of the camera 11) between the base 12 and the camera 11 engaged by the slide mechanism 37 to thereby suppress a rattling and keep the camera 11 on the base 12. The positioning of the camera 11 in the camera-mounting direction (F) can be performed by the second spring plate portion 42 and the front edge 21 (functioning as a locating portion) of the base 12.

According to the first embodiment, the following advantages can be achieved.

When the camera 11 is engaged with the base 12 fixed to the vehicle's front glass 17 by sliding the camera 11 through the slide mechanism 37, the spring member 40 generates a pressing force in the direction perpendicular to the sliding direction between the base 12 and the camera 11 to thereby hold the camera 11 on the base 12 without rattling. Since the camera 11 can be attached/detached to/from the base 12 by sliding against the sliding resistance due to the pressing force of the spring member 40, the camera 11 can be easily attached and detached. Further, since the spring member 40 is provided as a separate member, the above advantage is obtained even when the base 12 and the camera 11 are made of a non-elastic metal.

Since, the spring member 40 is equipped with the S-shaped spring portion 47 having the first to third spring plate portions 41 to 43, while not only the load for attaching/detaching the camera 11 but also the load for holding the camera 11 on the base 12 can be easily adjusted, the camera 11 can be prevented from being unintentionally detached from the base 12.

Figure 5:
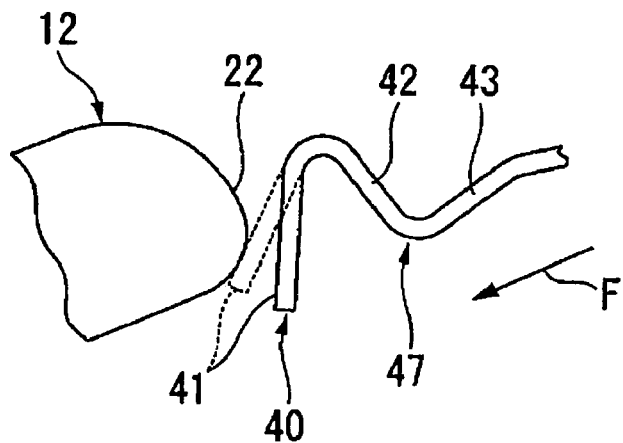
FIG. 5 shows another example of the base and the spring member.

For example, as shown in FIG. 5, the load for mounting the camera 11 can be decreased by decreasing the inclination angle of the first spring plate portion 41 with respect to the camera-mounting direction (F), as indicated by the dotted line. Also, the load for mounting the camera 11 can be increased by increasing the inclination angle of the first spring plate portion 41, as indicated by the solid line.

Figure 6:
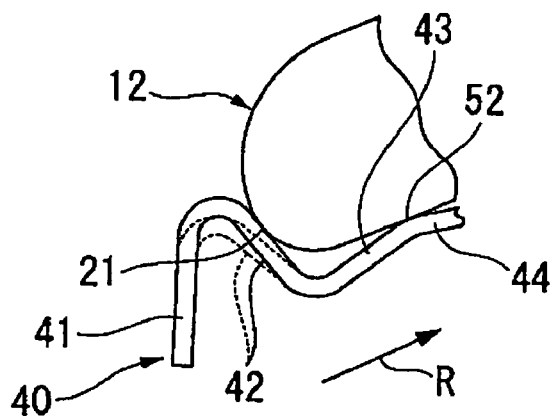
FIG. 6 shows yet another example of the base and the spring member.

And, as shown in FIG. 6, the load for detaching the camera 11 can be decreased by decreasing the inclination angle of the second spring plate portion 42 with respect to the camera-detaching direction (R), as indicated by the dotted line. Also, the load for detaching the camera 11 can be increased by increasing the inclination angle of the second spring plate portion 42, as indicated by the solid line, to thereby prevent the camera 11 from being unintentionally detached.

Figure 7:
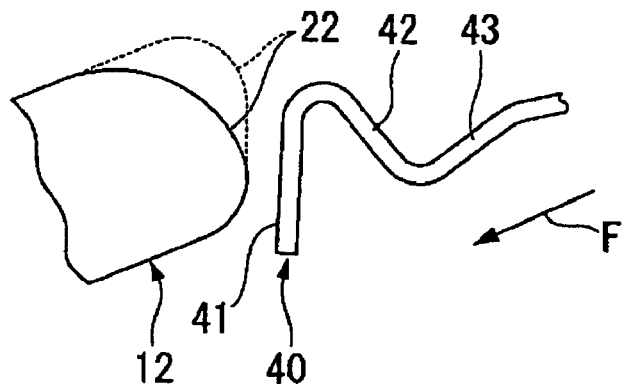
FIG. 7 shows yet another example of the base and the spring member.

For example, the load for mounting the camera 11 can be decreased not by adjusting the load at the spring member 40, but by setting the rear edge 22 of the base 12 to the rearward and upward direction with respect to the camera-mounting direction (F), as indicated by the dotted line in FIG. 7. The load for mounting the camera 11 can be increased by setting the rear edge 22 of the base 12 to the rearward and downward direction as indicated by the solid line.

Figure 8:
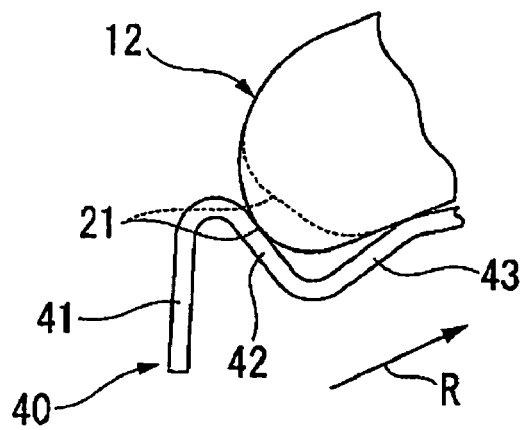
FIG. 8 shows yet another example of the base and the spring member.

And, as shown in FIG. 8, by setting the front edge 21 of the base 12 toward the forward and downward direction with respect to the camera-detaching direction (R), as indicated by a dotted line, the load for detaching the camera 11 can be decreased. Also, the load for detaching the camera 11 can be increased by setting the front edge 21 of the base 12 toward the forward and upward direction as indicated by the solid line.

For example, as the position of the natural state of the bending portion 52 between the third spring plate portion 43 and the fourth spring plate portion 44 gets higher, the load for holding the camera 11 on the base 12 can be increased.

Since the spring member 40 is equipped with the S-shaped spring portion 47 having the first to third spring plate portions 41 to 43, when the camera 11 is moved to be mounted, the base 12 rides on the bending portion 50 between the first spring plate portion 41 and the second spring plate portion 42 so that the sliding resistance increases. When the base 12 is in the mounted position, the sliding resistance decreases because the base 12 is away from the bending portion, thereby generating a so-called clicking feeling. Further, since the bending portion 52 is provided between the third spring plate portion 43 and the fourth spring plate portion 44 to be stepped from the bending portion 50, a sound is generated when the bending portion 52 comes in contact with the base 12. Therefore, the fact that the camera 11 is mounted in a right place can be recognized.

Since the front edge 21 on the base 12, which is provided as a locating portion, is engaged to the second spring plate portion 42 of the S-shaped spring portion 47, the camera 11 can be located with respect to the base 12 in the sliding direction with a simple structure.

Figure 9:
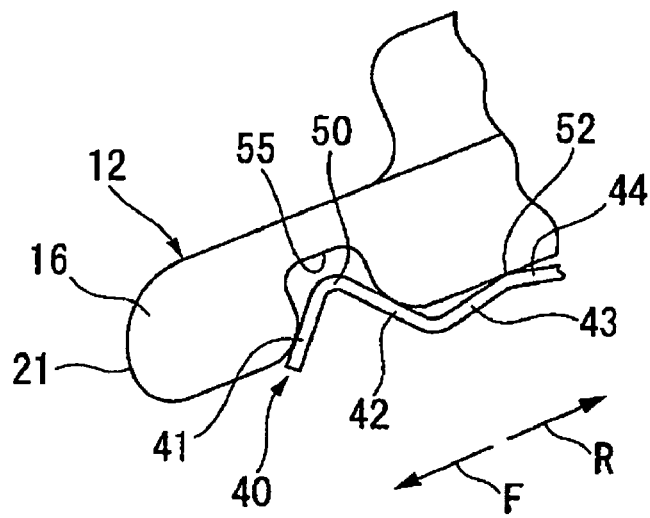
FIG. 9 shows a modification of the base and the spring member of the first embodiment.

As shown in FIG. 9, a concave portion 55 having a rectangular cross-section may be formed on the bottom of the base 12 as a locating portion. In this case, the first spring plate portion 41 and the second spring plate portion 42 are in a line contact with the concave portion 55, and the bending portion 50 therebetween is inserted into the concave portion 55. As a result, the rattling of the camera 11 with respect to the base 12 in the attachment/detachment direction can be suppressed, and the positioning in this direction can be performed.

Figure 10:
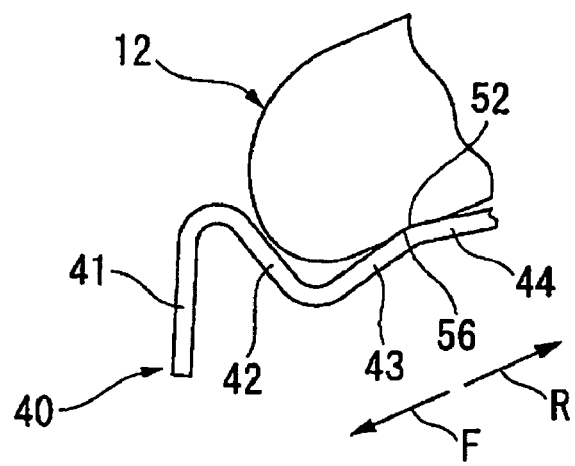
FIG. 10 shows another modification of the base and the spring member of the first embodiment.

As shown in FIG. 10, a concave portion 56 having a triangular cross-section may be formed on the bottom of the base 12. In this case, the third spring plate portion 43 and the fourth spring plate portion 44 are in a surface contact with the concave portion 56, and the bending portion 52 therebetween is inserted into the concave portion 56. As a result, the rattling of the camera 11 with respect to the base 12 in the attachment/detachment direction can be suppressed, and the positioning in this direction can be performed.

Figure 11:
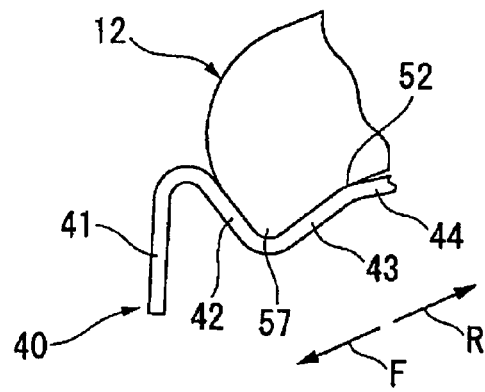
FIG. 11 shows yet another modification of the base and the spring member of the first embodiment.

As shown in FIG. 11, a protrusion 57 may be formed on the bottom of the base 12. In this case, the protrusion 57 is inserted between the second spring plate portion 42 and the third spring plate portion 43 so as to be in contact therewith. As a result, the rattling of the camera 11 with respect to the base 12 in the attachment/detachment direction can be suppressed, and the positioning in this direction can be performed.

Since the slide mechanism 37 is formed of the sliding guide portions 24 and 24 extending further to the left and right sides than the attachment portion 15 of the base 12 for the front glass 17, and the left and right slide concave portions 36 and 36 formed to face with each other in the left and right slide walls 34 and 34 protruding upwardly from the top surface of the camera 11, the camera 11 can be engaged with the base 12 with a simple structure. Therefore, the cost can be suppressed.

Since the spring member 40 is attached between the left and right slide walls 34 and 34 of the camera 11, in a state where the camera 11 is mounted on the base 12, the spring member 40 can be surrounded so as not to be exposed. As a result, an external appearance can be improved.

A structure for mounting a camera on a vehicle according to a second embodiment is described with reference to FIGS. 12 and 13, focusing on the difference from the first embodiment.

Figure 12:
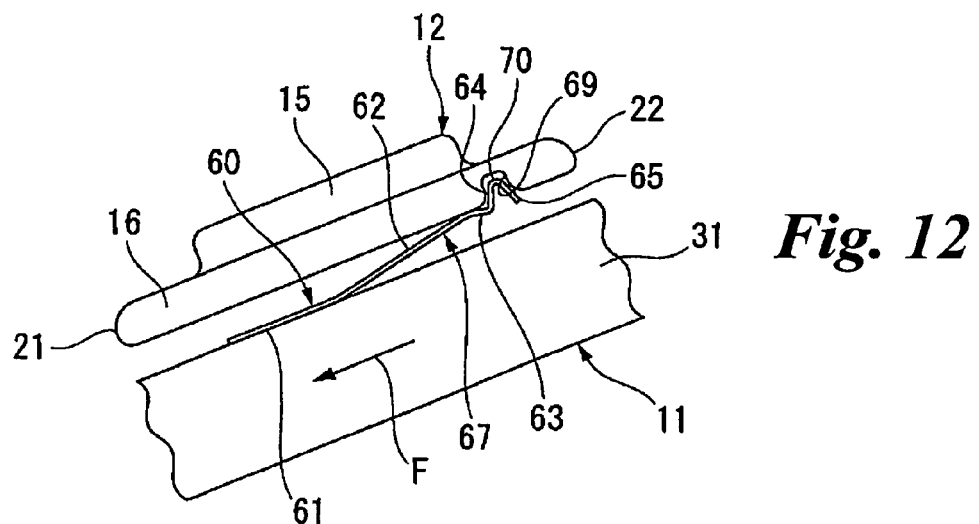
FIG. 12 is a partial side view showing the state after the engagement in a second embodiment.

In the second embodiment, as shown in FIG. 12, a spring member 60 has an attachment plate portion 61 and first to fourth spring plate portions 61 to 65. The attachment plate portion 61 extends in the camera-mounting direction (F). The first spring plate portion 62 extends from a rear end of the attachment plate portion 61, and inclines toward the rearward and upward direction with respect to the attachment plate portion 61. The second spring plate portion 63 extends from a rear end of the first spring plate portion 62, and inclines toward the rearward and downward direction with respect to the first spring plate portion 62. The third spring plate portion 64 extends from a rear end of the second spring plate portion 63, and inclines toward the rearward and upward direction with respect to the second spring plate portion 63. The fourth spring plate portion 65 extends from a rear end of the third spring plate portion 64, and inclines toward the rearward and downward direction with respect to the third spring plate portion 64.

The spring member 60 is attached to the top surface of the case 31 of the camera 11 by at the attachment plate portion 61 which is adjacent to the first spring plate portion 62. And, the first to third spring plate portions 62 to 64 form an S-shaped spring portion 67.

A concave portion 69 having a rectangular cross-section is formed on the bottom of the base 12, and the camera 11 is located in the sliding direction with respect to the base 12 by inserting a bending portion 70 between the third spring plate portion 64 and the fourth spring plate portion 65 into the concave portion 69.

According to the second embodiment, since the spring member 60 is attached to the camera 11 by the attachment plate portion 61 which is adjacent to the first spring plate portion 62, the base 12 can smoothly ride on the second spring plate portion 63 from the attachment plate portion 61 side (fixed side). Thus, the spring member 60 can be prevented from being reversely opened.

Figure 13:
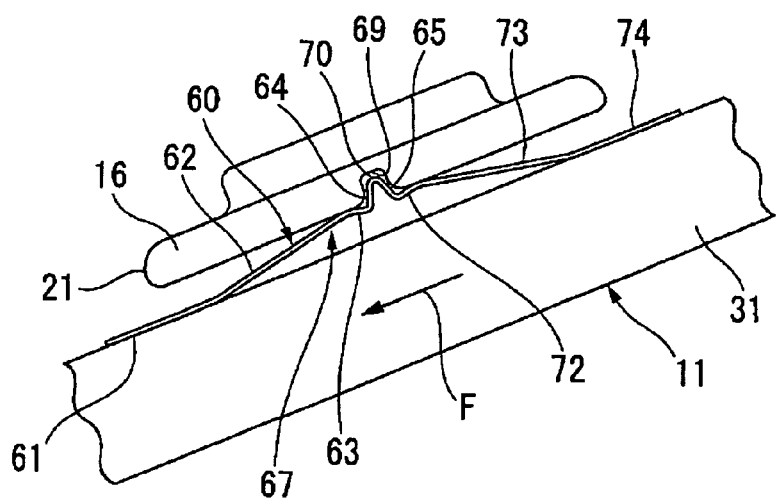
FIG. 13 is a partial side view showing a modification of a spring member of the second embodiment.

As shown in FIG. 13, the spring member 60 may be replaced with a spring member 70 further including a fifth spring plate portion 72, a sixth spring plate portion 73 and a second attachment plate portion 74. The fifth spring plate portion 72 extends from a rear end of the fourth spring plate portion 65, and inclines toward the rearward and upward direction with respect to the fourth spring plate portion 65. The sixth spring plate portion 73 extends from a rear end of the fifth spring plate portion 72, and inclines toward the rearward and downward direction with respect to the fifth spring plate portion 72. The second attachment plate portion 74 extends from a rear end of the sixth spring plate portion 73, and inclines toward the rearward and upward direction to be in the sliding direction F.

Both of the attachment plate portion 61 and the second attachment plate portion 74 may be attached to the top surface of the case 31 of the camera 11.

The attachment portion 15 of the base 12 may be attached to a portion, such as the roof, other than the front glass 17. Alternatively, the attachment portion 15 may also be attached to the top side of an instrument panel with an upside down position.

The present invention is not limited to the above-described embodiments. For example, while each embodiment exemplifies the case where the spring member (40, 60 or 70) is provided on the camera 11, such spring member may be provided on the base 12.

The invention claimed is:

1. A structure for mounting a camera on a vehicle, comprising:
   a base fixed to a vehicle body;
   a camera;
   a slide mechanism configured to allow the camera to slide in a sliding direction so as to be detachably engaged with the base; and
   a spring member, attached to the camera and configured to generate a pressing force in a direction perpendicular to the sliding direction between the base and the camera in an engaged state, thereby holding the camera with respect to the base,
   wherein the spring member includes an S-shaped spring portion, the S-shaped spring portion including
      a first spring plate portion inclining such that a rear portion thereof in the sliding direction goes away from the camera,
      a second spring plate portion extending from a rear end of the first spring plate portion in the sliding direction and inclining towards an opposite direction of the first spring plate portion, and
      a third spring plate portion extending from a rear end of the second spring plate portion in the sliding direction and inclining towards an opposite direction of the second spring plate portion, and
   wherein the base includes a locating portion to be engaged with the S-shaped spring portion to thereby locate the camera in the sliding direction.

2. The structure of claim 1,
   wherein the spring member is attached to the camera at a side of the first spring plate portion.

3. The structure of claim 1,
   wherein the base includes sliding guide portions respectively provided at left and right sides of the sliding direction,
   wherein the camera includes slide walls respectively provided at the left and right sides of the sliding direction, the slide walls having slide concave portions respectively formed on facing sides thereof, and
   wherein the slide mechanism is formed of the sliding guide portions and the slide concave portions.

4. The structure of claim 3,
   wherein the spring member is attached to the camera between the left and right slide walls.

5. The structure of claim 3,
   wherein the S-shaped spring portion includes
      a fourth spring plate portion extending from a rear end of the third spring plate portion in the sliding direction and inclining towards an opposite direction of the third spring plate portion, the third spring plate portion and the fourth spring plate portion defining a bending portion therebetween, and
   wherein the spring member generates the pressing force to hold the camera with respect to the base by the bending portion defined between the third spring plate portion and the fourth spring plate portion.

6. The structure of claim 1,
wherein the locating portion of the base engages with the second spring plate portion of the S-shaped portion.

7. A structure for mounting a camera on a vehicle, comprising:
- a base fixed to a vehicle body;
- a camera;
- a slide mechanism configured to allow the camera to slide in a sliding direction so as to be detachably engaged with the base; and
- a spring member, attached to the camera and configured to generate a pressing force in a direction perpendicular to the sliding direction between the base and the camera in an engaged state, thereby holding the camera with respect to the base,
- wherein the spring member includes an S-shaped spring portion, the S-shaped spring portion including
  - a first spring plate portion inclining such that a rear portion thereof in the sliding direction goes away from the camera,
  - a second spring plate portion extending from a rear end of the first spring plate portion in the sliding direction and inclining towards an opposite direction of the first spring plate portion, and
  - a third spring plate portion extending from a rear end of the second spring plate portion in the sliding direction and inclining towards an opposite direction of the second spring plate portion, and wherein the spring member is attached to the camera at a side of the first spring plate portion.

8. The structure of claim 7,
wherein the base includes a locating portion to be engaged with the S-shaped portion to thereby locate the camera in the sliding direction.

9. The structure of claim 7,
wherein the base includes sliding guide portions respectively provided at left and right sides of the sliding direction,
wherein the camera includes slide walls respectively provided at the left and right sides of the sliding direction, the slide walls having slide concave portions respectively formed on facing sides thereof, and
wherein the slide mechanism is formed of the sliding guide portions and the slide concave portions.

10. The structure of claim 7,
wherein the base includes sliding guide portions respectively provided at left and right sides of the sliding direction,
wherein the camera includes slide walls respectively provided at the left and right sides of the sliding direction, the slide walls having slide concave portions respectively formed on facing sides thereof, and
wherein the slide mechanism is formed of the sliding guide portions and the slide concave portions.

\* \* \* \* \*